United States Patent [19]

Yamamoto

[11] Patent Number: 4,996,892
[45] Date of Patent: Mar. 5, 1991

[54] FLYWHEEL ASSEMBLY

[75] Inventor: Kouzou Yamamoto, Neyagawa, Japan

[73] Assignee: Kabushiki Kaisha Daikin Seisakusho, Osaka, Japan

[21] Appl. No.: 445,864

[22] PCT Filed: Apr. 10, 1989

[86] PCT No.: PCT/JP89/00386

§ 371 Date: Nov. 8, 1989

§ 102(e) Date: Nov. 8, 1989

[87] PCT Pub. No.: WO89/09894

PCT Pub. Date: Oct. 19, 1989

[30] Foreign Application Priority Data

Apr. 11, 1988 [JP] Japan .................. 63-48559[U]

[51] Int. Cl.⁵ .................................. F16F 15/10
[52] U.S. Cl. ............................ 74/574; 74/572; 192/70.17; 192/70.27; 464/68
[58] Field of Search ............ 74/572, 573 R, 574; 192/70.17, 70.27, 106.20; 464/68, 89

[56] References Cited

U.S. PATENT DOCUMENTS

| | | | |
|---|---|---|---|
| 4,468,207 | 8/1984 | Yoshida | 74/574 X |
| 4,790,419 | 12/1988 | Loizeau | 192/106.2 X |
| 4,813,295 | 3/1989 | Drexl et al. | 74/572 |
| 4,813,524 | 3/1989 | Reik | 74/574 |
| 4,820,239 | 4/1989 | Despres et al. | 464/68 |
| 4,825,712 | 5/1989 | Slattery et al. | 74/574 X |
| 4,844,224 | 7/1989 | Fukushima | 192/70.17 |
| 4,844,225 | 7/1989 | Fukushima | 192/70.17 |
| 4,857,032 | 8/1989 | Aiki et al. | 192/106.2 X |
| 4,889,009 | 12/1989 | Friedmann et al. | 74/574 |
| 4,889,218 | 12/1989 | Chasseguet et al. | 74/574 X |
| 4,899,617 | 2/1990 | Kobayashi et al. | 74/574 |
| 4,904,226 | 2/1990 | Chasseguet et al. | 464/68 |

FOREIGN PATENT DOCUMENTS 61-59040 3/1986 Japan.
61-51687 11/1986 Japan.
62-159825 7/1987 Japan.
62-184261 8/1987 Japan.

Primary Examiner—Vinh T. Luong
Attorney, Agent, or Firm—Armstrong, Nikaido, Marmelstein, Kubovcik and Murray

[57] ABSTRACT

A flywheel assembly comprising a torque limiting mechanism (14) having an annular holder (40) and drum (45). The holder (40) and drum (45) have, respectively, a flange (51) and a friction portion (54). The flange (51) and a friction portion (54) have formed therebetween a space in which are disposed first and second friction plates (41,44). A driven plate (43) is disposed between the first and second friction plates (41,44). An annular first friction material (46a) is disposed between the flange (51) and the first friction plate (41). An annular second friction material (46b) is disposed between the driven plate (43) and the second friction plate (44). An annular third friction material (46c) is disposed between the second friction plate (44) and the friction portion (54). An annular fourth friction material (46d) is disposed between the friction portion (54) and an end surface (55) of second flywheel (12). A Belleville spring (42) is disposed between the first friction plate (41) and the driven plate (43).

10 Claims, 2 Drawing Sheets

FLYWHEEL ASSEMBLY

This invention relates to a flywheel assembly having a transmission mechanism for absorbing vibration torque of an engine.

BACKGROUND ART

A flywheel assembly disclosed e.g. in the Japanese Examined Patent Publication No. 60-1497 is well known as a prior art.

The prior art including a first flywheel fastened to a crank shaft, a second flywheel aligned with the first flywheel, and torsion spring mechanism and torque limiting mechanism disposed between the first and second flywheels. In the arrangement, the torque limiting mechanism has narrow friction surface so that a transmitted torque is small. Thus, the prior arrangement can not be employed for heavy duty vehicles such like a truck, a bus, or the like.

Accordingly, it is an object of the present invention to provide a flywheel assembly having a torque limiting mechanism and is used for heavy duty vehicles such like a truck, a bus, or the like.

SUMMARY OF THE INVENTION

The present invention relates to a flywheel assembly which including a substantial annular first flywheel connected to a crank shaft, a second flywheel concentrically rotatably aligned with the first flywheel, a torsion spring mechanism and a torque limiting mechanism installed in a space formed between the first and second flywheels. The torsion spring mechanism is located at an outer peripheral portion of the space. Sub-plates of the torsion spring mechanism are connected to the first flywheel. Torsion springs provided with distances therebetween in a circumferential direction are disposed between the sub-plates. The torque limiting mechanism is located at inner peripheral portion of the space. The torque limiting mechanism has a substantial annular holder which has an inner peripheral boss connecting to the second flywheel and a drum which has a substantial annular friction portion aligning with the second flywheel and a cylindrical portion integrally extending from an outer periphery of the friction portion having an edge surrounding the holder. A substantial annular first friction plate is concentrically disposed between a flange of the holder and the friction portion. The first friction plate has an outer peripheral portion which forms claws fitted in the recesses formed in the cylindrical portion. A substantial annular driven plate is disposed between the first friction plate and the friction portion. Claws are integrally projecting from circumferentially spaced places of an outer periphery of the driven plate to radial outwardly through the recesses of the cylindrical portion and are abutting on the torsion springs. An annular second friction plate is disposed between the driven plate and the friction portion. Claws are integrally projecting from circumferentially spaced places of an inner periphery of the second friction plate to radial inwardly through recesses formed in the boss. An annular first friction material is disposed between the flange and first friction plate. An annular second friction material is disposed between the driven plate and the second friction plate. An annular third friction material is disposed between the second friction plate and the friction portion of the drum. An annular fourth friction material is disposed between the friction portion and an end surface of the second flywheel. A Belleville spring is disposed between the first friction plate and the driven plate for generating urging force generated between the friction materials and abutting surfaces.

BEST MODE FOR CARRYING OUT THE INVENTION

Figure 1:
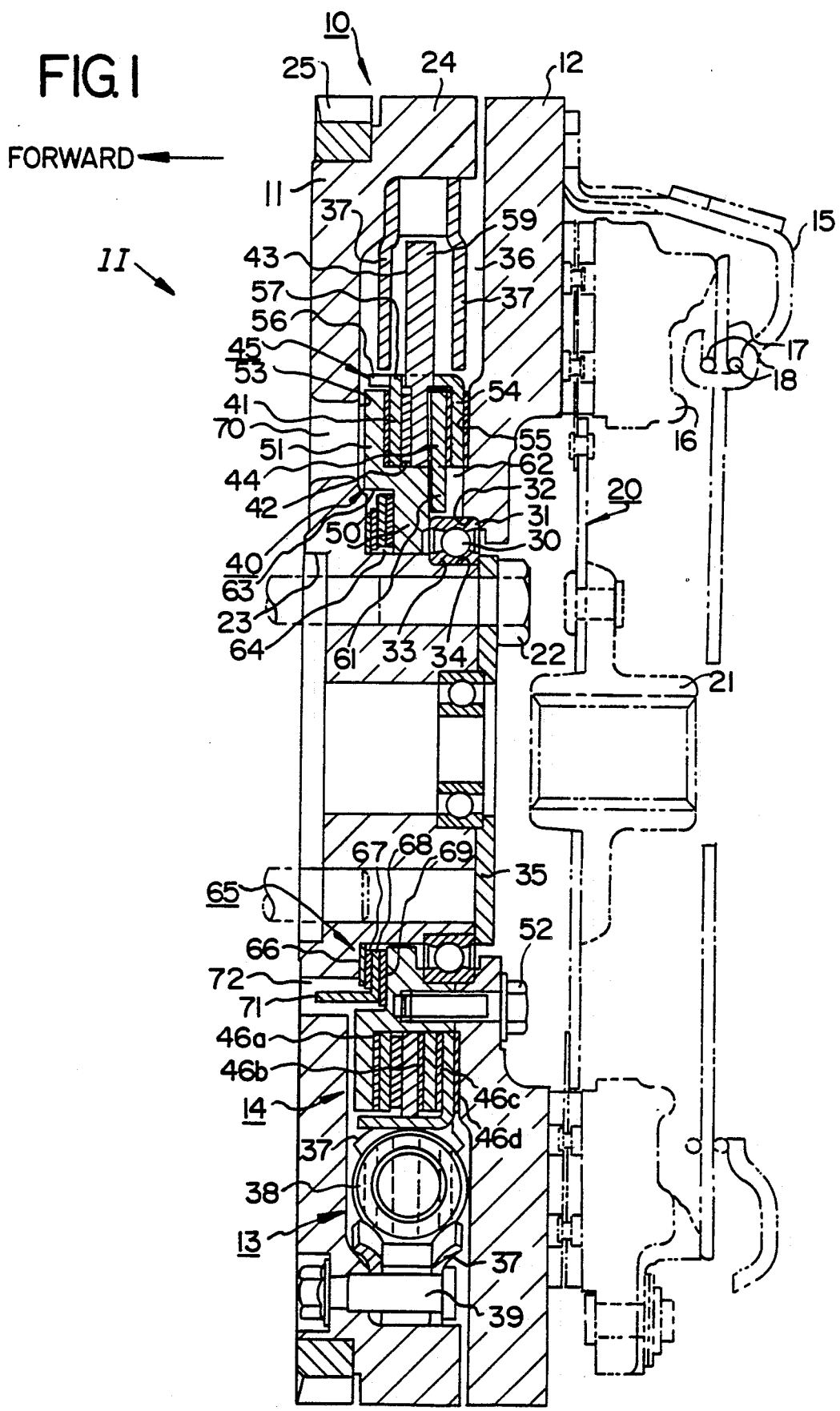
FIG. 1 is a vertical sectional view of the present invention.

In FIG. 1, which shows a clutch applied with the present invention, left side of the figure is regarded as front.

Referring in FIG. 1, numeral 10 is a flywheel assembly which is including a first flywheel 11, a second flywheel 12, a torsion spring mechanism 13, and a torque limiting mechanism 14. The flywheel assembly 10 has fastened thereto a clutch cover 15 in which are disposed a pressure plate 16 and a diaphragm spring 17. Numeral 18 designates wire rings. A clutch disc 20 is disposed between the pressure plate 16 and the flywheel assembly 10 for engage and disengage operations. The clutch disc 20 has a central hub 21 spline fitted onto an input shaft of transmission (not shown). The arrangement described hereabove is the same as the arrangement of well known prior arts.

The first flywheel 11 of the flywheel assembly 10 is formed in a substantially continuous annular shape and is fastened to a rear end of an engine crank shaft (not shown) by bolts 22 and a joint portion 23 formed at an inner periphery of the first flywheel 11. The first flywheel 11 has an outer periphery which forms a continuous outer wall 24 formed in a substantial annular shape. The outer wall 24 has a front end to which is fastened a ring gear 25.

A substantial annular second flywheel 12 located at rear side of the first flywheel 11 is concentrically rotatably secured by a bearing 30. The bearing 30 has an outer ring 31 fixed in a central bore 32 of the second flywheel 12 and an inner ring 33 fitted onto a central boss 34 of the first flywheel 11. The inner ring 33 is forwardly pressed by a plate 35 which is fastened to the first flywheel 11 by the bolts 22. A substantially continuous annular space is formed between the first and the second flywheels 11 and 12. The space has an outer peripheral portion in which is located the torsion spring mechanism 13 and an inner peripheral portion in which is located the torque limiting mechanism 14 which is an essential member of the present invention.

Torsion spring mechanism 13 has a pair of sub-plates 37 substantially formed into annular shape and torsion springs 38. Side plates 37 are fastened to the first flywheel 11 by bolts 39 provided with distances therebetween in a circumferential direction. Torsion springs 38 are located e.g. at six places with equal distances left therebetween in the circumferential direction.

Torque limit mechanism 14 has a holder 40, a first friction plate 41, a Belleville spring 42, a driven plate 43, a second friction plate 44, a drum 45, and friction members 46a, 46b, 46c and 46d. Holder 40 is formed in a substantial annular shape and has an inner peripheral boss 50 and an outer peripheral flange 51. Boss 50 is fastened onto a front end of an inner peripheral part of the second flywheel 12 by bolts 52 located e.g. at six places with equal distances left therebetween in the circumferential direction. Flange 51 has a substantial L-shaped cross section which radial outwardly extends so as to abut an inner rear end surface 53 of the first flywheel 11. Drum 45 is formed in a substantially continuous annular shape having a reverse L-shaped cross section. Together with the holder 40, the drum 45 forms a space in which is disposed the first friction plate 41 and other members. The drum 45 has an inner flange, or a friction portion 54 aligning with an inner end wall 55 of the second flywheel 12 and an outer cylindrical portion 56 extending forwardly from the outer periphery of the friction portion 54. Outer cylindrical portion 56 has a front end which surrounds an outer peripheral surface of the flange 51. First and second friction plates 41 and 44 are disposed in a space which are formed between a front surface of the friction portion 54 and a rear surface of the flange 51.

Figure 2:
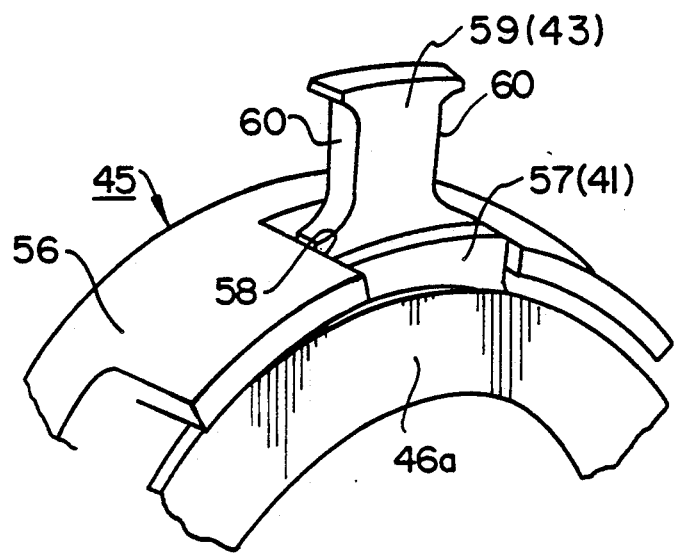
FIG. 2 is a partial perspective view of a drum and driven plate of the present invention.

The first friction plate 41 is formed in a substantial annular shape and has an outer periphery which forms claws 57. As shown in FIG. 2, which is a perspective view viewed in a direction of arrow II of FIG. 1, claws 57 fit in recesses 58 formed in the cylindrical portion 56 so as to rotate with the drum 45. Claws 57 and recesses 58 are, respectively, formed e.g. at four places with equal distances left therebetween in the circumferential direction.

First friction plate 41 has a surface aligning with the flange 51 (FIG. 1). The surface has fastened thereto a first friction material 46a e.g. by bonding.

As shown in FIG. 1, the Belleville spring 42 is disposed between the first friction plate 41 and the driven plate 43. The Belleville spring 42 urges forwardly the first friction plate 41 and backwardly the driven plate 43, thereby the first friction material 46a is pressed onto a rear surface of the flange 51.

The driven plate 43 is formed in a substantial annular shape and has an outer peripheral portion which forms claws 59 extending radial outwardly to a space formed between the sub-plates 37 of the torsion spring mechanism 13 through the recesses 58 (FIG. 2) formed in the cylindrical portion 56. As shown in FIG. 2, the claws 59 have circumferential opposite ends forming pressed surfaces 60 which abut end surfaces of the torsion spring 38 so as to connect the torsion spring mechanism 13 to the torque limiting mechanism 14.

As shown in FIG. 1, a second friction plate 44 is disposed between the driven plate 43 and the friction portion 54. The second friction plate 44 is formed in a substantial annular shape having an inner periphery which forms claws 61 provided with e.g. 4 spaces equally left therebetween in the circumferential direction. Claws 61 fit in recesses 62 formed at rear end of the boss 50 so that the second friction plate 44 is connected to the holder 40. The driven plate 43 has a rear end surface to which is bonded a second friction material 46b being in contact with the front surface of the second friction plate 44. The friction portion 54 has opposite surfaces to which are, respectively, bonded third and forth friction materials 46c and 46d.

Adhesive surfaces of the friction materials 46a, 46b, 46c and 46d are not restricted in the foregoing embodiment, but abutting surfaces may be available.

The flange 51, which has a substantial L-shaped cross section has formed thereon a step portion 63 by which is formed a continuous annular space 64 in which is installed a hysteresis mechanism 65. Hysteresis mechanism 65 consists of several members: a seat 66; a Belleville spring 67; a plate 68; and a friction member 69 lining up backwardly from the first flywheel 11 so that predetermined hysteresis is generated between the first and second flywheels 11 and 12 in the relative movement of the members 66, 67, 68 and 69. The hysteresis mechanism 65 is specifically disclosed in the Japanese Unexamined Utility Model Publication No. 61-23543, or the like.

The first flywheel 11 has formed therein air holes 70 provided with e.g. four distances left wherebetween in the circumferential direction so as to align with the flange 51. The first flywheel 11 has formed therein Holes 72 inwardly from the air holes 70. The plate 68 has formed thereon claws 71 which fit in the holes 71.

Function or operation of the foregoing embodiment is as follows. When a torque of an engine is transmitted to the first flywheel 11 by way of the crank shaft (not shown), the torque is transmitted to the second flywheel 12 by way of the torsion spring mechanism 13, torque limiting mechanism 14, and hysteresis mechanism 65. Abnormal torque or vibration is absorbed by the flywheel assembly 10 comprising the first and second flywheel 11 and 12, torsion spring mechanism 13, torque limiting mechanism 14, and hysteresis mechanism 65.

Figure 3:
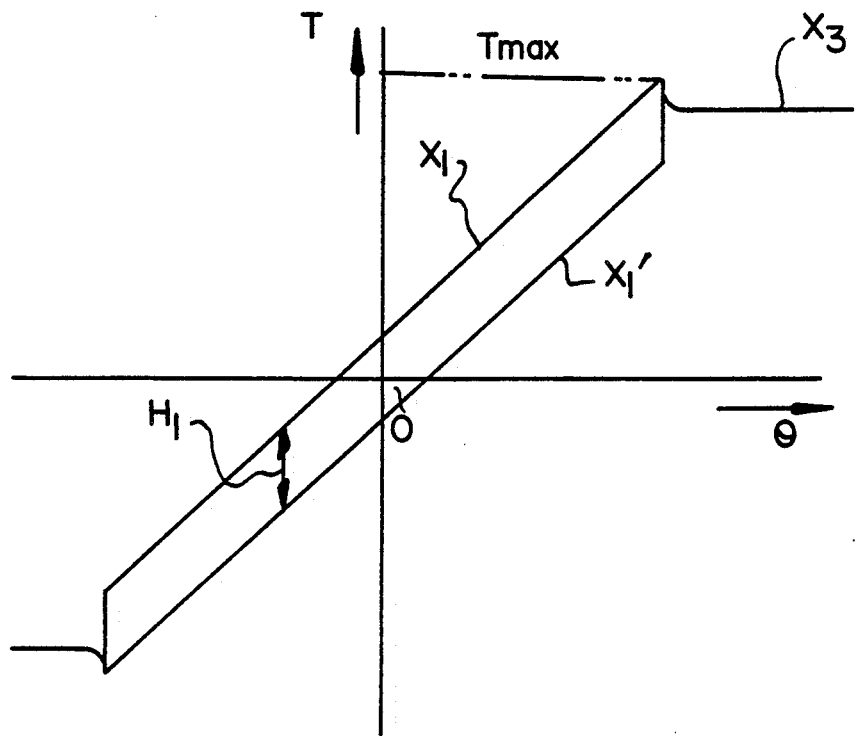
FIG. 3 is a graph showing torsion angle-torque characteristic.

In the relative movement of the first and second flywheels 11 and 12, each torsion spring 38 of the torsion spring mechanism 13 is compressed by the abutting pressed surface 60 (FIG. 2) of the claws 59 and the hysteresis mechanism 65 functions simultaneously, so that the characteristic X1 and hysteresis H1 of FIG. 3 will occur.

In the foregoing operation, the holder 40 will tend to move solidly with the second flywheel 12 because the holder 40 is fastened to the second flywheel 12 by the bolt 52. The driven plate 43 of the torque limiting mechanism 14 will also tend to move together with the first flywheel 11 by way of the torsion springs 38 of the torsion spring mechanism 13. Both the holder 40 and driven plate 43 will be restricted, however, in a domain of the characteristic X1 by the friction force of the first, second, third, and forth friction materials 46a, 46b, 46c and 46d preventing the operation of the torque limiting mechanism 14.

When the torque T generated in the torque limiting mechanism 14 develops more than the predetermined maximum torque $T_{max}$, the torque limiting mechanism 14 will start on work and the driven plate 43 will move relative to the holder 40, thereby a characteristic X3 of FIG. 3 will occur.

A maximum torque $T_{max}$ is determined by friction forth of the first, second, third, and forth friction materials 46a, 46b, 46c and 46d and friction surfaces abutting thereon. In the arrangement shown in FIG. 1, because wide friction surfaces are established by the friction materials 46a, 46b, 46c and 46d, only relative small urging forth is required for obtaining relative large maximum torque $T_{max}$ compare with the conventional arrangement.

The characteristics X3 and X1' will be obtained when the arrangement is returned from the maximum torque $T_{max}$.

According to the flywheel assembly of the present invention, as shown in FIG. 1, the torque limiting mechanism 14 installed between the first and second flywheels 11 and 12 is comprising the holder 40, first friction plate 41, Belleville spring 42, driven plate 43, second friction plate 44, drum 45, and first, second, third, and forth friction materials 46a, 46b, 46c and 46d, the friction materials 46a, 46b, 46c and 46d form the relative large friction surfaces which increase the maximum torque $T_{max}$ generated in the relative movement of the friction materials.

Thus, the present invention provides the suitable flywheel assembly for use of a clutch of a truck, a bus, or the like to which large torque is transmitted.

Further according to the invention, the holder 40 of the torque limiting mechanism 14 is connected to the second flywheel 12 by the boss 50 and is formed in the substantial annular shape extending to radial outer periphery of the flywheel. The drum 45 has the substantial annular friction portion 54 aligning with the second flywheel 12 and the cylindrical portion 56 integrally extending from the outer peripheral end of the friction portion 54 so as to form a space together with the holder 40. The cylindrical portion 56 has formed therein recesses 58 in which are fitted the claws 57 formed at the outer peripheral places of the annular first friction plate 41 aligning with the flange 51 of the holder 41. The claws 59 formed at the outer peripheral places of the first friction plate 41 and are extending to radial outwardly through the recesses 58 so as to abut the end portions of torsion springs 38. The annular second friction plate 44 is disposed between the driven plate 43 and the friction portion 54 of the drum 45. The claws 61 being formed at inner peripheral places of the second friction plate 44 and extending to radial inwardly through the recesses 62 formed in the boss 50. The annular first friction material 46a is disposed between the holder 40 and the first friction plate 41. The annular second friction material 46b is disposed between the driven plate 43 and the second friction plate 44. The annular third friction materials 46c is disposed between the second friction plate 44 and the friction portion 54 of the drum 45. The annular fourth friction material 46d is disposed between the friction portion 54 and the end wall 55 of the second flywheel 12. Thus, the relative large maximum torque $T_{max}$ can be obtained by disposing the friction materials 46a, 46b, 46c and 46d in the inner peripheral portion of narrow space 36.

Industrial Applicability

The flywheel assembly to which the present invention is applied as described hereinbefore is usefully employed in the clutch of a truck, a bus, or the like.

I claim:

1. A flywheel assembly comprising a substantial annular first flywheel connected to a crank shaft; a second flywheel concentrically rotatably aligning with the first flywheel; a torsion spring mechanism and a torque limiting mechanism installed in a space formed between the first and second flywheels; characterized by that said torsion spring mechanism located at an outer peripheral portion of said space; a pair of sub-plates of said torsion spring mechanism connected to said first flywheel; torsion springs provided with spaced distances therebetween in a circumferential direction and disposed between said sub-plates; said torque limiting mechanism being located at inner peripheral portion of said space and having a substantial annular holder and drum; said holder having an inner peripheral boss connecting to said second flywheel; said drum having a substantial annular friction portion aligning with said second flywheel and a cylindrical portion integrally extending from the outer periphery of said friction portion; said cylindrical portion having an edge surrounding said holder; a substantial annular first friction plate disposed between a flange of said holder and said friction portion and having an outer peripheral portion which forms claws fitted into said recesses formed in said cylindrical portion; a substantial annular driven plate disposed between said first friction plate and said friction portion; claws integrally projecting from circumferentially spaced places of the outer periphery of said driven plate to radial outwardly through said recesses and abutting on said torsion springs; an annular second friction plate disposed between said driven plate and said friction portion of said drum, claws integrally projecting from circumferentially spaced places of the inner periphery of said second friction plate to radial inwardly through recesses formed in said boss; an annular first friction material disposed between said flange and said first friction plate; an annular second friction material disposed between said driven plate and said second friction plate; an annular third friction material installed between said second friction plate and said friction portion of said drum; an annular fourth friction material disposed between said friction portion and the end surface of said second flywheel; and a Belleville spring disposed between said first friction plate and said driven plate for generating urging force generated between said friction materials and the surfaces abutting thereon.

2. A flywheel assembly as set forth in claim 1, wherein said first friction material is bonded to the abutting surface of said flange.

3. A flywheel assembly as set forth in claim 1, wherein said first friction material is bonded to the abutting surface of said first friction plate.

4. A flywheel assembly as set forth in claim 1, wherein said second friction material is bonded to the abutting surface of said driven plate.

5. A flywheel assembly as set forth in claim 1, wherein said second friction material is bonded to the abutting surface of said second friction plate.

6. A flywheel assembly as set forth in claim 1, wherein said third friction material is bonded to the abutting surface of said second friction plate.

7. A flywheel assembly as set forth in claim 1, wherein said third friction material is bonded to the abutting surface of said friction portion.

8. A flywheel assembly as set forth in claim 1, wherein said fourth friction material is bonded to the abutting surface of said friction portion.

9. A flywheel assembly as set forth in claim 1, wherein said fourth friction material is bonded to the abutting surface of said end surface of second flywheel.

10. A flywheel assembly as set forth in claim 1, wherein said driven plate has a torsion spring pressed surface deeply recessed in a circumferential direction.

* * * * *